United States Patent
Bharghavan et al.

(10) Patent No.: US 6,728,257 B1
(45) Date of Patent: Apr. 27, 2004

(54) FLUID FLOW FAIR SCHEDULING EMULATION IN WIRELESS SHARED CHANNEL PACKET COMMUNICATION NETWORK

(75) Inventors: Vaduvur Bharghavan, Champaign, IL (US); Songwu Lu, Champaign, IL (US); Rayadurgam Srikant, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/143,302

(22) Filed: Aug. 28, 1998

(51) Int. Cl.$^7$ ................................................ H04L 12/43
(52) U.S. Cl. ........................ 370/458; 370/228; 370/347
(58) Field of Search ................................ 370/230, 237, 370/238, 332, 329, 330, 337, 347, 458, 459, 468, 437, 230.1, 231, 232, 235, 216, 217, 228, 333; 455/436–444

(56) References Cited

U.S. PATENT DOCUMENTS

| | | | |
|---|---|---|---|
| 5,001,703 A | * | 3/1991 | Johnson et al. ............. 370/347 |
| 5,184,347 A | | 2/1993 | Farwell et al. |
| 5,195,090 A | | 3/1993 | Bolliger et al. |
| 5,195,091 A | | 3/1993 | Farwell et al. |

(List continued on next page.)

FOREIGN PATENT DOCUMENTS

| | | |
|---|---|---|
| JP | 9326805 | 12/1997 |
| WO | 9107030 | 5/1991 |
| WO | 9711565 | 3/1997 |
| WO | 9711570 | 3/1997 |
| WO | 9722216 | 6/1997 |

OTHER PUBLICATIONS

J.C.R. Bennett, H. Zhang, "WF$^2$Q: Worst–Case Fair Weighted Fair Quencing", *Proceedings of IEEE INFOCOM*, vol. 1, pp. 120–128, 1996.

P. Bhagwat, P. Bhattacharya, A. Krishna, S. Tripathi, "Enhancing Throughput Over Wireless LANs Using Channel State Dependent Packet Scheduling", *Proceedings of IEEE INFOCOM*, vol. 3, pp. 1133–1140, 1996.

(List continued on next page.)

*Primary Examiner*—Dang Ton
*Assistant Examiner*—Phuc Tran
(74) *Attorney, Agent, or Firm*—Greer, Burns & Crain, Ltd.

(57) ABSTRACT

A wireless shared channel network packet communication method emulates fluid flow fair scheduling. Errors inherent in wireless communication and unaccounted for in fair scheduling for wired networks are accounted for according to the method. Lagging communication flows, typically caused by burst errors in wireless communication systems, make up for their lag by causing leading flows to give up their lead. The method is independent of the pattern of channel error. In a preferred embodiment, lag compensation is accounted for by a service tag which identifies a precedence for contention based upon the previous denial of access for channel error. This precedence allows compensation when channels become error free. A modified preferred embodiment first attempts intraframe compensation by swapping slots when a host predicts an error for its assigned slot and another host assigned a later slot is able to transmit in the slot. Interframe compensation, when needed, is accomplished preferably by a round robin contention among backlogged flows. Errors are predicted by hosts for a subsequent slot when activity is sensed in a current slot but no good packet is received. Preferred packet structures include data and control slots, with data slots partitioned to provide necessary error status and backlog information piggybacked with data so a base has sufficient information to implement compensation in contention resolution.

19 Claims, 6 Drawing Sheets

U.S. PATENT DOCUMENTS

| | | | |
|---|---|---|---|
| 5,206,881 A | | 4/1993 | Messenger et al. |
| 5,260,944 A | * | 11/1993 | Tomabechi .................. 370/347 |
| 5,299,199 A | * | 3/1994 | Wilson et al. ............... 370/347 |
| 5,303,234 A | * | 4/1994 | Kou .......................... 370/85.2 |
| 5,438,565 A | | 8/1995 | Hemmady et al. |
| 5,473,602 A | | 12/1995 | McKenna et al. |
| 5,475,681 A | | 12/1995 | White et al. |
| 5,483,671 A | | 1/1996 | Helm et al. |
| 5,515,379 A | * | 5/1996 | Crisler et al. ............... 370/347 |
| 5,583,869 A | * | 12/1996 | Grube et al. ................ 370/347 |
| 5,666,348 A | | 9/1997 | Thornberg et al. |
| 5,708,655 A | | 1/1998 | Toth et al. |
| 5,726,984 A | | 3/1998 | Kubler et al. |
| 5,742,588 A | | 4/1998 | Thornberg et al. |
| 5,752,166 A | * | 5/1998 | Dorenbosch et al. ....... 455/67.1 |
| 5,901,226 A | * | 5/1999 | Brenner et al. ............. 370/332 |
| 5,923,648 A | * | 7/1999 | Dutta .......................... 370/347 |
| 5,926,458 A | * | 7/1999 | Yin ............................ 370/230 |
| 5,987,021 A | * | 11/1999 | Erickson et al. ............ 370/347 |
| 6,049,538 A | * | 4/2000 | Scott .......................... 370/347 |
| 6,058,107 A | * | 5/2000 | Love et al. ................. 370/332 |
| 6,097,707 A | * | 8/2000 | Hodzic et al. ............... 370/337 |
| 6,108,322 A | * | 8/2000 | Kotzin et al. ............... 370/333 |
| 6,169,730 B1 | * | 1/2001 | Jacklin et al. .............. 370/321 |
| 6,201,795 B1 | * | 3/2001 | Baum et al. ................ 370/252 |

OTHER PUBLICATIONS

V. Bharghavan, A. Demers, S. Shenker, L. Zhang, "MACAW: A Media Access Protocol for Indoor Wireless LANs", *Proceedings of ACM Sigcomm*, vol. 24, No. 4, Oct. 1994.

A. Demers, S. Keshav, S. Shenker, "Analysis and Simulation of a Fair Queueing Algorithm", *Proceedings of ACM Sigcomm*, vol. 19, No. 4, Sep. 1989.

M. Gerla and J.T. Tsai, "Multicluster, Mobile, Multimedia Network", *ACM Baltzer Journal of Wireless Networks*, vol. 1, No. 3, Oct. 1995.

P. Goyal, H. M. Vin, H. Cheng, "Start–Time Fair Queuing: A Scheduling Algorithm for Integrated Services Packet Switching Networks", *Proceedings of ACM Sigcomm*, vol. 26, No. 4, Oct. 1996.

M.J. Karol, Z. Liu, K.Y. Eng, "An Efficient Demand–Assignment Multiple Access Protocol for Wireless Packet (ATM) Networks", *ACM Journal on Wireless Networks*, vol. 1, No. 3, Oct. 1995.

H. Zhang, "Service Disciplines for Guaranteed Performance Service in Packet–Switching Networks", *Proceedings of IEEE*, vol. 83, No. 10, Oct. 1995.

A. Parekh, "A Generalized Processor Sharing Approach to Flow Control in Integrated Services Networks", Ph.D. Thesis, *MIT Laboratory for Information and Decision Systems*, Technical Report LID–TR–2089, 1992.

* cited by examiner

FIG. 1a

FLOW VARIABLES

```
weight           : weight assigned to flow
finish_HOL_tag   : adjusted finish tag of HOL packet
packet_queue     : queue of packets to be transmitted
lag_bound        : bound on the lag of the flow
lead_bound       : bound on the lead of the flow
```

PACKET QUEUE VARIABLES

```
head   : pointer to the first packet in the queue
tail   : pointer to the last packet in the queue
```

PACKET VARIABLES

```
start_tag    : start tag (in virtual time) of the packet
finish_tag   : finish tag (in virtual time) of the packet
```

SYSTEM VARIABLES

```
current_time              : current real time
current_virtual_time      : current virtual time
current_channel_capacity  : current channel capacity
max_packet_size           : packet size
array of flows flow[]     : array of flows
number_of_flows           : number of flows
```

FIG. 1b

```
backlogged_weight = 0    /* initially assume that no flow is backlogged */
for(i = 0; i < number_of_flows;i ++)
      if (flow[i].packet_queue.head != NULL)
            backlogged_weight += flow[i].weight
                  /* add weight for each backlogged flow */
current_virtual_time += current_channel_capacity/backlogged_weight
```

FIG. 1c

```
p = create_packet()              /* creates a packet structure */
p.start_tag = max(current_virtual_time, flow[i].packet_queue.tail[finish_tag])
p.finish_tag = p.start_tag + max_packet_size / flow[i].weight
append_packet_to_flow(p, i)    /* queues the new packet to the tail */
```

FIG. 1d

```
readjust_tags()              /* described in Figure 1e */
selected_flow = -1           /* initially assume that no flow is selected */
selected_finish_tag = INFINITY    /* finish tag of selected flow */
for(i = 0;i < number_of_flows;i ++)
      if (flow[i].packet_queue.head != NULL) and (clean_channel(i))
            if (flow[i].finish_HOL_tag < selected_finish_tag)
                  selected_flow = i
                  selected_finish_tag = flow[i].finish_HOL_tag
      /* select the backlogged flow which has a clean channel and
         has the minimum finish tag */
if (selected_flow == -1)
      return
else
      transmit_HOL_packet(selected_flow)
```

FIG. 1e

```
for(i = 0; i < number_of_flows;i ++)
      if (flow[i].packet_queue.head == NULL)
      /* if flow is backlogged, set finish tag to infinity */
            flow[i].finish_HOL_tag = INFINITY
      else if (flow[i].packet_queue.head[finish_tag] <
                  current_virtual_time - flow[i].lag_bound)
      /* if flow is lagging beyond its bound, readjust the tag to reflect
         the lag bound */
            flow[i].finish_HOL_tag =
                  current_virtual_time - flow[i].lag_bound
      else if (flow[i].packet_queue.head[start_tag] >
                  current_virtual_time + flow[i].lead_bound)
      /* if flow is leading beyond its bound, readjust the tag to reflect
         the lead bound */
            flow[i].finish_HOL_tag = current_virtual_time +
                  flow[i].lead_bound + max_packet_size/flow[i].weight
      else
      /* if flow is not violating its lag or lead bounds, set finish
         tag of flow to finish tag of its HOL packet */
            flow[i].finish_HOL_tag = flow[i].packet_queue.head[finish_tag]
```

```
schedule_frame()  /* main procedue to schedule packets in frame */
   compute_effective_weights();
   spread_new_frame();  /* spread according to WFQ;
                          ignore flows with effective credit < 0 */
   marker = first_slot_of_frame:
   while(marker != NULL)
      f = get_next _flow();
      marker->marker->next;
      if (f != NULL) transmit_head_of_line_packet(f);
         /* transmit the hol packet and increment f->attempts */ compute_effective_credits()  /* compute effective credits for all
                                flows at the start of a frame */
   for each flow f,
      f->credit = min(max(f->effective_weight - f->attempts,
                     -(f->debit_limit)), f->credit_limit);
      f->effective_weight = f->weight + f->credit;
      f->attempts = 0;

get_next_slot()  /* return flow that can transmit in current slot;
                    perform swapping and credit/debit allocation */
   while(marker != NULL)
      if (queue_empty(marker->flow))  /* case 1: flow has no queue */
         delete_flow_slots_from_frame(marker->flow);
         delete_flow_from_backlogged_set(marker->flow);
         marker = marker->next;
```

| FIG. 3a |
| FIG. 3b |

```
else if (exception_case())   /* case 2: no flow can transmit */
    (marker->flow)->attempts ++;  /* no credit for missed slot */
    marker = marker->next;
    return NULL;
else if (slot_state(marker->flow) == ERROR)
                              /* case 3: channel is in error */
    for (s = marker->next; s != NULL; s = s->next)
        if ((!(queue_empty(s->flow))) kk (slot_state(s->flow)==CLEAN))
            break;  /* flow pointed by s can swap with marker->flow */
    if (s != NULL)
        swap_flows(marker, s);  /* case 3a: intra frame swap */
    else
        return find_next_good_flow();  /* case 3b: no swap credit/
            debit is implicit due to how f->attempts is updated */
else  /* case 4: connection has packet and slot is good */
    return marker->flow;
return NULL;
```

| FIG. 3a |
|---------|
| FIG. 3b |

FLUID FLOW FAIR SCHEDULING EMULATION IN WIRELESS SHARED CHANNEL PACKET COMMUNICATION NETWORK

FIELD OF THE INVENTION

The present invention generally concerns base and host wireless shared channel packet communication networks. The method of the invention more specifically concerns channel scheduling among contending hosts in such base and host wireless shared channel packet communication networks.

BACKGROUND OF THE INVENTION

A basic problem in shared resource communication is the need to allocate the resource between competing hosts which utilize the resource. In wired communication networks, such as local area networks (LANs), metropolitan area networks (MANS), and wide area networks (WANs), physical layer and medium access layer portions of the network protocol resolve contentions between competing nodes, or hosts, which seek communication access over the physical wire which is the backbone of the network. Token passing, in which a token is passed around a ring and the host possessing the token is permitted to communicate, is an example of contention resolution.

As wired networks have evolved, however, token passing and other straightforward arrangements have been recognized as having inherent inefficiencies in the allocation of network communication bandwidth. Typical Ethernet and similar commercially available switches use a first-in-first out packet queueing arrangement. Inefficiencies in such techniques have lead to development of wired network fair queuing models that seek to fairly allocate the shared resource taking into account the amount, or weight, of traffic associated with each host seeking access. The basis for such networks is a fluid flow model, which seeks to model each packet flow as a fluid pipe. Heavily weighted packet flows see larger access availability without denying or foreclosing some access to the shared wire resource to less weighted packet flows.

Future indoor and outdoor packet cellular environments will seek to support communication-intensive applications currently supported primarily by wired networks, such as multimedia teleconferencing and world wide web browsing. Supporting such applications requires the wireless network to provide sustained quality of service to packet flows over scarce and shared wireless networking resources. In wired networks, quality of service requirements are typically satisfied by a combination of resource reservation (at the flow level) and fair resource allocation/packet scheduling (at the packet level).

Various fair queuing models have been previously proposed for wired networks. These are based upon an assumption of an error free and constant capacity communication medium. A popular model for packet scheduling over a wired link is the fluid fair queueing model. In this model, packet flows are modeled as fluid flows through a channel of capacity C, and every flow f is assigned a weight $r_f$; over any infinitesimally small window of time $[t, t+\Delta t]$, a backlogged flow f is allocated a channel capacity of $C(t).\Delta t.(r_f/\Sigma_{i \in B(t)} r_i)$, where $B(t)$ is the set of flows that are backlogged at time t and $C(t)$ is the channel capacity at time t. There are several known packet-level algorithmic implementations of this model, such as WFQ, $WF^2Q$, SCFQ, STFQ, etc. Essentially, the goal of each of these algorithms is to serve packets in an order that approximates fluid fair queueing as closely as possible. All of these algorithms assume that the channel is error-free, or at least that either all flows can be scheduled or none of them can be scheduled.

Such assumptions are invalid in wireless media. Wireless media are prone to various types of errors that violate the error free and constant capacity assumptions. Bursty errors are typically caused by external interference and prevent effective communication for a limited period of time. Location dependent errors arise from interference or fading path associated with hosts in a particular geographic area, frequently at the edge of a base's communication range. Hidden/exposed host errors arise from stations which are within receiver range but outside of transmitter range or vice versa. Since wireless transmissions are locally broadcast, contention and effective channel capacity are location-dependent, which impedes application of the model to wireless communications. Interference, fades, multipath effects, and channel errors are also location-dependent in wireless communications. This implies that at any time, only a subset of flows can be scheduled on the channel. Thus, in packet cellular environments, user mobility and wireless channel error are significant impediments to both resource reservation and fair packet scheduling.

Another unique concern in packet cellular networks is that within a cell, every host is only guaranteed to be within the range of the base station, and all transmissions are either uplink or downlink. Thus, the base station is the only logical choice for the scheduling entity in a cell. However, the base station has only limited knowledge about the arrival of packets in uplink flows. In particular, the base station may know if an uplink flow has any outstanding packets, but it does not know when packets arrive, or how many packets there are in the queue at any instant. Thus it cannot be assumed that convenient tagging mechanisms accompany packet arrivals, as assumed in most wired medium fair queueing algorithms.

Accordingly, there is a need for an improved base and host wireless shared channel network packet communication method which accounts for the aforementioned difficulties. There is a further need for an improved communication method which extends benefits of fluid modeled wired communication shared resource contention into wireless communication networks and accounts for errors inherent to wireless communication media.

SUMMARY OF THE INVENTION

These and other needs are met or exceeded by the present base and host wireless shared channel network packet communication method. Lagging communication flows, typically caused by burst errors in wireless communication systems, make up for their lag by causing leading flows to give up their lead. In a preferred embodiment, lag compensation is accounted for by a service tag which identifies a precedence for contention based upon the previous denial of access for channel error. This precedence allows compensation when channels become error free. A modified preferred embodiment first attempts intraframe compensation by swapping slots when a host predicts an error for its assigned slot and another host assigned a later slot is able to transmit in the slot for which the error was predicted. Interframe compensation, when needed, is accomplished preferably by a round robin contention among backlogged flows. Errors are predicted by hosts for a subsequent slot when activity is sensed in a current slot but no good packet is received. Preferred packet structures include data and control slots, with data slots partitioned to provide necessary error status and backlog information piggybacked with data so a base has sufficient information to implement compensation in contention resolution.

BRIEF DESCRIPTION OF DRAWINGS

FIG. 1a defines variables for a scheduling algorithm of a particular preferred first embodiment in accordance with the FIG. 1 general embodiment;

FIG. 1b is pseudo code for virtual time computation in the first embodiment;

FIG. 1c is pseudo code for processing a packet arrival in the first embodiment;

FIG. 1d is pseudo code for a scheduling loop of the first embodiment;

FIG. 1e is pseudo code for a tag readjustment in the scheduling loop of the first embodiment;

FIG. 3 (consisting of FIGS. 3a and 3b) is pseudo code for a scheduling algorithm according to a modified embodiment of the invention.

DETAILED DESCRIPTION OF THE INVENTION

Figure 1:
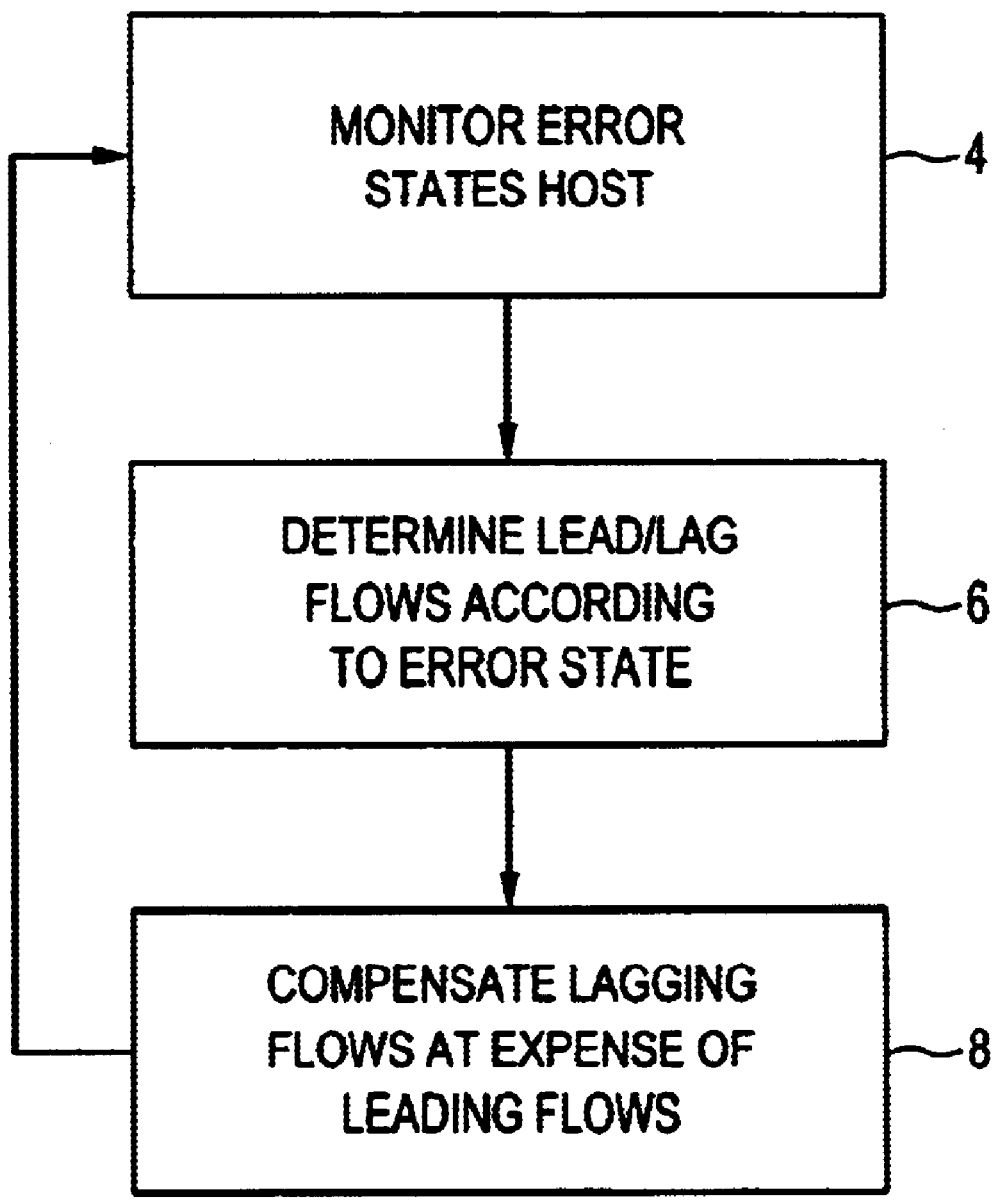
FIG. 1 shows general steps of a preferred general embodiment of the invention.

Broadly, the present invention is directed to a fluid flow modeled contention resolution in wireless communication networks. Errors inherent to wireless communication which contribute to the backing up of communication flows are accounted for by the present method. Lag in flows caused by errors is made up at the expense of leading flows. Hosts predict next slot errors based upon a current slot, and a predicted error is compensated. Intraframe compensation is preferably first attempted and is preferably realized by a swap of slots with a later slot that predicts no error for the next slot. Credits and debit values may also be maintained to compensate between leading flows and lagging flows. Such values may implement interframe compensation where a slot swap is not possible intraframe, or may form the basic methodology for compensation.

Network Model

The preferred embodiments of the invention are described with reference to a typical packet cellular network with a high-speed wired backbone and small, partially overlapping, shared channel wireless cells. Each cell is served by a base station, which performs the scheduling of packet transmissions for the cell. Neighboring cells are assumed to transmit on different logical channels. All transmissions are either uplink (from a mobile host to a base station) or downlink (from a base station to a mobile host). Every mobile host in a cell can communicate with the base station, though it is not required for any two mobile hosts to be within range of each other. Each flow of packets is identified by a <host, uplink/ downlink flag, id> triple. A flow "perceives a channel error" (i.e., sees a "bad" channel state) if either the source or the destination of the flow experiences an error burst in its locality. Error patterns are assumed to vary depending on location. No explicit assumptions are made about the error model, though simulations used to measure the performance of the invention typically use a two-state Markov chain model. Simulations varied the transition probabilities to generate a range of error patterns in the wireless channels, ranging from highly bursty to Bernoulli distributed errors.

Wireless Fluid Fair Queueing

Fluid Fair Queueing wired network models treat each packet flow as a fluid flow. Each flow i is given a weight $r_i$, and for any time interval $[t_1, t_2]$ during which there is no change in the set of backlogged flows $B(t_1, t_2)$, the channel capacity granted to each flow i, $W_i(t_1, t_2)$, satisfies the following property:

$$\forall i, j \in B(t_1, t_2), \quad \left| \frac{W_i(t_1, t_2)}{r_i} - \frac{W_j(t_1, t_2)}{r_j} \right| = 0 \qquad (1)$$

The above definition of fair queueing is applicable for both channels with constant capacity and channels with time varying capacity. However, it does not address the issue of location-dependent channel error.

Consider three backlogged flows with $r_1=r_2=r_3=\frac{1}{3}$. Flow 1 and flow 2 have error free channels while flow 3 perceives a channel error during the time interval $[0,1]$. By applying equation (1) over the time periods $[0,1]$ and $[1,2]$, the channel capacity allocation is:

$$W_1[0,1]=W_2[0,1]=\frac{1}{2}, \; W_1[1,2]=W_2[1,2]=W_3[1,2]=\frac{1}{3}.$$

Now, over the time window $[0,2]$, the allocation is:

$$W_1[0,2]=W_2[0,2]=\frac{5}{6}, \; W_3[0,2]=\frac{1}{3}$$

which does not satisfy the fairness property of equation (1). This simple example illustrates the difficulty in defining fairness in a wireless network, even in an idealized model. In general, server allocations designed to be fair over one time interval may be inconsistent with fairness over a different time interval.

In the fluid fair queueing model, when a flow has nothing to transmit during a time window $[t, t+\Delta]$, it is not allowed reclaim the channel capacity that would have been allocated to it during $[t, t+\Delta]$ if it were backlogged at t. However, in a wireless channel, it may happen that the flow is backlogged, but unable to transmit due to channel error. In particular, consider the scenario when flows $f_1$ and $f_2$ are both backlogged, but f, perceives a channel error while $f_2$ perceives a good channel. In this case, $f_2$ will additionally receive the share of the channel which would have been granted to $f_1$ in the error-free case. The question is whether the fairness model should readjust the service granted to $f_1$ and $f_2$ in a future time window in order to compensate $f_1$. The traditional fluid fair queueing model does not need to address this issue since in a wireline model, either all flows are able to transmit or none of them is able to transmit.

These issues are addressed by the present invention, while empty queues and channel errors are treated differently. This is different from known models, such as the Virtual Clock which allows inactive flows to reclaim channel capacity for inactive empty queue periods or traditional fair queuing, which does not allow for compensation later for a flow that is unable to transmit according to its schedule. From a user-centric perspective, the present invention allows well-behaved flows to remain oblivious of short error bursts, and react only to prolonged error bursts. In particular, use is made of the fact that some channels may be error free when other channels experience error, to implicitly swap the channel allocation over short time windows in order to accommodate short error bursts. However, separation between flows is also provided by bounding the amount of compensation that can be provided to a flow due to its channel error. Essentially, a trade-off is between full compensation models and full separation models in order to provide bounded compensation. Compensation is only made if the flow has packets to transmit but is unable to do so because of channel error. A flow is not penalized for using the entire channel capacity if no other flow had anything to send.

Referring to FIG. 1, given the arrival processes for each of the flows and the error patterns perceived by each of the flows, the invention defines error-free service as the fluid fair queueing service for the flows with identical arrival processes and completely error-free channels. (Step 4) A flow is determined to be lagging at any time instant if its queue length is greater than the queue length of its error-free service at the same time instant. (Step 6) A flow is defined to be leading at any time instant if its queue length is less than the queue length of its error-free service at the same time instant. (Step 6) The present invention compensates lagging flows by causing leading flows to give up their lead. (Step 8) By artificially bounding the amount of the lag and lead, a trade-off is made between long-term fairness and separation between flows. The bounds on lag and lead for each flow are defined as follows.

1. The aggregate lags of all flows which will be compensated is bounded by a constant B bits. A lagging flow i with weight $r_i$ is allowed to compensate a maximum of $$b_i = B * \frac{r_i}{\sum_{j \in F} r_j}$$

bits, where F is the set of all flows.

2. A leading flow is allowed to lead by a maximum of $l_i$ bits. Specifically, even when a flow is ahead of its error-free service by more than $l_i$ bits, it only gives up a channel capacity worth $l_i$ bits to other contending flows.

The wireless fair queueing model of a first preferred embodiment may now be defined. The granularity of transmission of a flow is a bit. Each bit has a service tag, which is the virtual time of its error-free service. The service tag of a backlogged flow is the service tag of the first bit in its queue; the service tags of a nonbacklogged flow is ∞. The virtual time at any instant is the virtual time of the error-free service at the same instant. Based on the above definitions, the wireless fluid fair queueing server works as follows:

1. The next bit to be transmitted is chosen from the head of the queue of the flow with the minimum service tag among the backlogged flows which perceive a good channel.
2. Each lagging flow i is allowed to retain (at most) the earliest $b_i$ bits with a service tag less than the current virtual time.
3. If a flow i leads its error-free service by more than $l_i$ bits, its service tag is adjusted to reflect a lead of $l_i$ bits.

There are three important points to note regarding the wireless fluid fair queueing model of the first embodiment: (a) the flow which has lagged the longest has the lowest service tag, and hence has highest precedence to access the channel, (b) a flow which always perceives an error-free channel may still lag its error-free service by up to B bits because it has to defer for lagging flows with lower service tags, and (c) a flow which leads by more than $l_i$ bits does not have to "pay" for more than $l_i$ bits; likewise, a flow which lags by more than $b_i$ bits cannot reclaim more than $b_i$ bits.

Idealized Wireless Fair Queueing Algorithm

In this section, an idealized wireless fair queueing (IWFQ) algorithm is described that realizes the wireless fluid fair queueing model of the first preferred embodiment. This algorithm is idealized because it makes two key assumptions: (a) each flow knows whether it can transmit correctly in the current slot (i.e., transmitted packets are never lost in transit), and (b) packets can be tagged as soon as they arrive. The more typical case where such assumptions do not hold true is addressed by the modified embodiment described later. For simplicity of illustration, it is assumed that all packets are of the same size $L_P$, and that each packet is transmitted in one slot.

Algorithm Description

The overview of the algorithm is the following, where FIG. 1a defines state variables for the algorithm:

1. Simulate the error-free fluid service for the flows. At any instant, the virtual time for the idealized wireless fair queueing algorithm is the virtual time of the error-free service at the same instant. Pseudo code for the virtual time computation is shown in FIG. 1b.
2. Each arriving packet is tagged as in the conventional Weighted Fair Queueing (WFQ) algorithm: a packet with sequence number n of flow i arriving at time $A(t_{i,n})$ is assigned two tags: a start tag $s_{i,n}$ and a finish tag $f_{i,n}$, defined as follows:

$$s_{i,n} = \max\{v(A(T_{i,n})), f_{i,n-1}\} \qquad (2)$$

$$f_{i,n} = s_{i,n} + L_P/r_i \qquad (3)$$

v(A(t)) is derived from the error-free service as follows:

$$dv(t)/dt = C(t) \bigg/ \sum_{i \in B(t)} r_i$$

where C(t) is the channel capacity in bits/sec at time t, and B(t) is the set of backlogged flows at time t in the error-free service. Pseudo code showing processing for a packet that arrives at the current-time for flow i is shown in FIG. 1c.

3. The actions in the scheduling loop are the following:
   (a) readjust tags for each flow.
   (b) for each flow, set its service tag equal to the finish tag of the head of line packet of the flow. If there is no packet in the queue, set the service tag to ∞.
   (c) among the flows which can transmit (i.e., channel is good), pick the flow with least service tag and transmit its head of line packet. This algorithm adapts the selection process of conventional WFQ. By restricting the packets eligible for selection to only those which would have started their error-free service in the fluid model, we could adapt the selection process of the conventional WF²Q.

Pseudo code for implementing the scheduling loop is shown in FIG. 1d.

4. Readjusting tags for a flow involves the following:
   (a) for each lagging flow i, if the number of packets with finish tags less than the virtual time is greater than $$B_i = \frac{B \cdot r_i}{\sum_{i \in F} r_i \cdot L_P},$$

then retain only the first (lowest tagged) $B_i$ packets in the queue and delete the remaining packets. An error-free weighted fair queueing service will lag by at most one packet.

(b) for each leading flow i, if the start tag of the head of line packet ($s_{i,hol}$) is greater than the virtual time (v(t)) by more than $l_i/r_i$, then $$S_{i,hol}=v(t)+l_i/r_i, f_{i,hol}=S_{i,hol}+L_P/r_i \quad (4)$$

Pseudo code for implementing tag readjustment is shown in FIG. 1e. The service that a flow receives in the IWFQ algorithm is never behind the service that it would receive in the wireless fluid fair queueing model by more than $L_P$ (for the same reason that the service in WFQ is never behind the service in FFQ by more than $L_P$). For error-free service, IWFQ and WFQ are identical. When some flows perceive short error-bursts (i.e., neither lags nor leads exceed their bounds), IWFQ performs local adjustments in channel allocation in order to compensate the flows for their channel allocation. The goal of IWFQ is thus to approximate conventional WFQ while still accommodating short-term errors. However, the present IWFQ and conventional WFQ differ in several important ways.

In the IWFQ of the invention, a flow which is denied service because of channel error is guaranteed to eventually receive service after its channel becomes good since its service tag does not change. Thus, backlogged flows receive precedence in channel allocation when their channels become error-free.

The separation property of conventional WFQ (which guarantees that the worst case delay for the head-of-line packet of a flow i, $d_{WFQ}^{max} \leq L_P/C+(L_P \cdot \Sigma_{i \in F} r_i)/r_i \cdot C$) is independent of the behavior of other flows) is only valid for IWFQ with the following bounds: $d_{IWFQ}^{max} \leq d_{WFQ}^{max}+B/C$.

Finally, an important difference between IWFQ and conventional WFQ lies in the way that packets are discarded in each algorithm. In WFQ, packets are discarded if the flow gets backlogged by more than its maximum buffer size. In addition to the above, packets may be discarded in IWFQ if a flow lags by more than $B_i$ packets. IWFQ provides a mechanism to separate the issues of how many packets should be discarded and which packets should be discarded. This mechanism is also useful for handling lost/corrupted packets if it cannot be assumed that the channel state can be predicted accurately.

Slot Queues and Packet Queues

Since a flow i is allowed to lag by at most $B_i$ packets, during prolonged error bursts, it may be forced to discard packets from its queue. If the flow discards packets from the head of the queue, its service tag increases; thus the guarantee that a lagging flow eventually has the lowest service tag (and hence has highest precedence to access the channel) would not be preserved. On the other hand, for delay-sensitive but loss-tolerant flows, retaining packets which have already waited in the queue for a long time is meaningless. Essentially, lagging flows should have the ability to discard any packets from a backlogged queue without losing precedence in channel access.

Figure 2A:
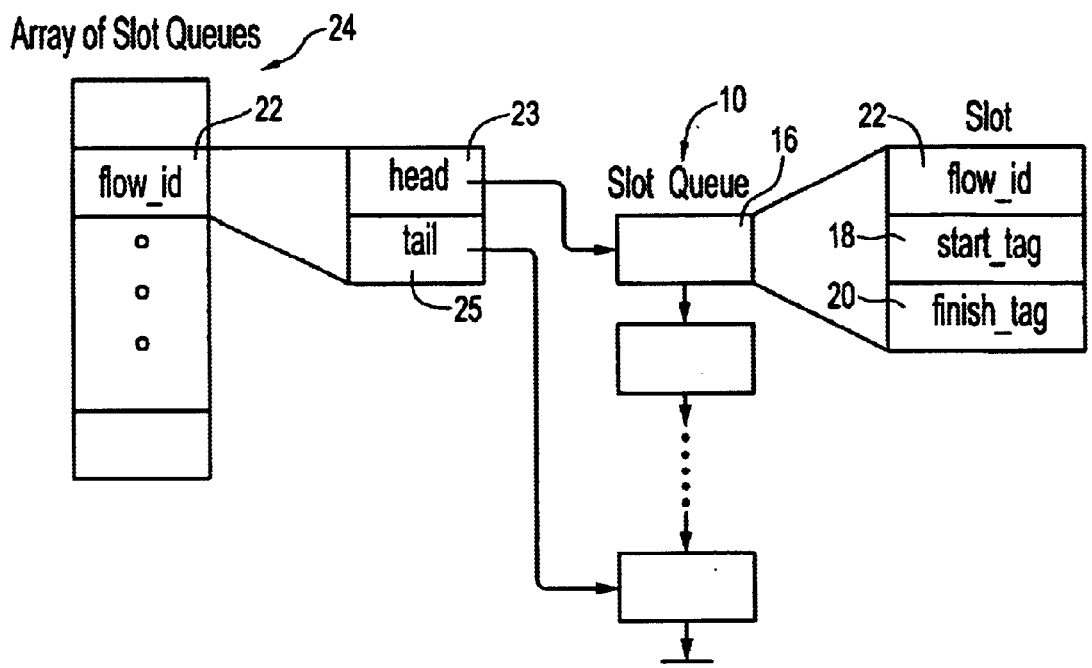
FIG. 2 is a block diagram of a preferred packet and slot queue decoupling used by a first preferred embodiment of the invention.
Figure 2B:
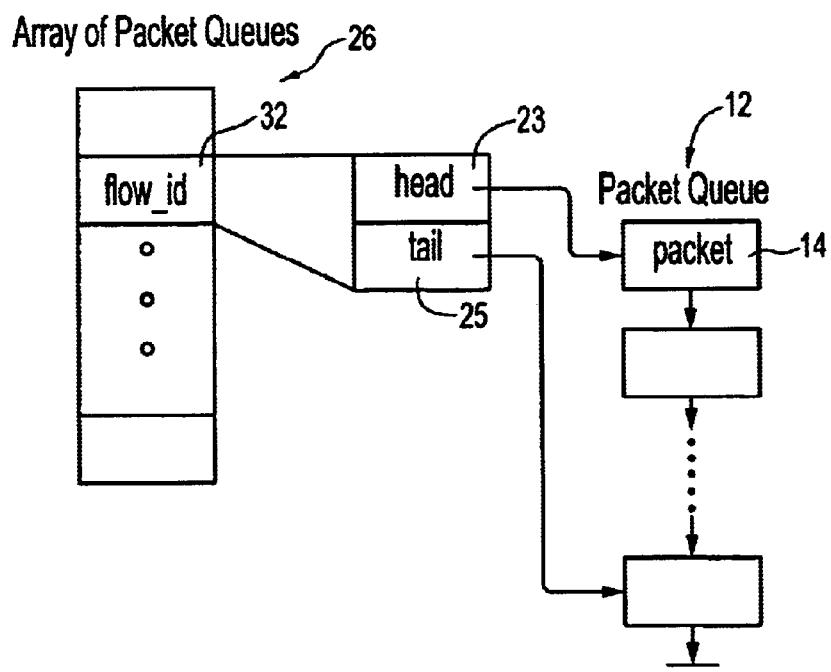

In order to achieve such a decoupling, two queues are maintained for each flow, as seen in FIG. 2: a logical slot queue 10 and a packet queue 12. When a new packet arrives, the following actions are taken: (a) the packet 14 joins the packet queue, (b) a new slot 16 is created and assigned the start tag 18 and finish tag 20 corresponding to the packet, (c) the slot joins the slot queue. At any time, the maximum number of lagging slots is bounded by $B_i$ for a flow i 22, and slots with the lowest finish tags are retained in order to preserve the precedence of channel access for the lagging flow. The service tag for a flow is the finish tag of the head of line slot 23 in its slot queue. A tail slot 25 for a flow cannot exceed Bi. Considering the combination of separate flows together produces an array of slot queues 24 and a corresponding array of packet queues 26.

A separate mechanism deletes packets from the packet queue depending on the requirements of the flow. For example, a packet may be deleted after a fixed number of retransmissions or after a delay bound has expired. When a slot is selected for transmission, the head of line packet in the packet queue is transmitted—thus the mapping between slots and packets is dynamic. By decoupling slot queues from packet queues, multiple types of delay and loss requirements for flows are handled while still maintaining the precedence in channel access for lagging flows.

Throughput and Delay Guarantees for the IWFQ

The following facts should be apparent to artisans from the IWFQ algorithm described above:

Fact 1: At any time t, the number of lagging bits of flow i, denoted by $b_i(t)$, satisfies $\Sigma_{i \in F} b_i(t) \leq \Sigma_{i \in F} B_i L_P = B$, where $L_P$ is the packet length in bits.

Fact 2: For any lagging slot s of flow i at time t, its finish tag is no greater than that of any nonlagging slot, i.e., it is served with higher priority.

The following results regarding error-free fluid fair queueing (FFQ) and error-free WFQ (error-free FFQ and error-free WFQ refer to FFQ and WFQ, respectively, when all the channels are error free) have been previously demonstrated, and are included here for quick reference.

$$\overline{S}_i(0, r) - S_i^*(0, r) \leq L_P, \quad S_i^*\left(0, r + \frac{L_P}{C}\right) \geq S_i(0, r) \quad (5)$$

Lemma 1. Let $\overline{S}_i(r,t)$ and $S_i^*(r,t)$ be the amount of flow i traffic (in bits, not packets) served under the fluid fair queueing and the error-free WFQ in the interval (r,t), for all times r and flows i:
For all packets p, let $\overline{F}$ and $F_p^*$ be the time at which packet p departs under the fluid fair queueing and the WFQ, $$F_p^* - \overline{F} \leq L_P/C, \quad (6)$$

where C is the channel capacity (in bits per second) and $L_P$ is the packet length in bits.

The delay and throughput results in this section are given separately for two types of channels: (a) Error-free Channel: an error-free channel is one which is always in the good state at all time slots, and (b) Error-prone Channel: an error-prone channel is one which is not always in the good state.

Error-free Channels

Based on Facts 1 and 2, the following result:

Lemma 2. Any slot s on an error-free channel g completes its service in IWFQ by time $t_{ef}+\overline{d}_g$, with $$\overline{d}_g = B/C. \quad (7)$$

where $t_{ef}$ is the finish time of slot s in the error-free WFQ algorithm, F denotes the set of all flows, $L_P$ is the packet length (in bits) and C is the channel capacity (in bits per second).

Proof

Consider an arbitrary time t, at which slot s is the head-of-line slot for flow g. If slot s has received service in IWFQ before or at $t_{ef}$, i.e., flow g is leading at this time, then the result is trivially true. In the following, the only case considered is that in which slot s receives its service later than $t_{ef}$ in the IWFQ.

Denote the current virtual time as v(t) (i.e., the bit round in progress as defined in equation 4. At virtual time v(t), in the error-free WFQ, let the slot sequence waiting to be served be m, m+1, . . . , s−1, s, s+1, . . . , k where slot sequence 0, 1, . . . , m−1 has been transmitted by the time t in the error-free WFQ. The finish tag associated with a slot i is denoted as $T_i$. Let s belong to flow g. The remaining waiting time (after t) in terms of time slots for s under error-free WFQ is s−m.

Consider the scenario for the IWFQ algorithm at time t. Let B(t) denote the set of the lagging slots (ordered by their finish tags) by all flows at time t, i.e., when m becomes eligible for service in the slot sequence. Note that the total number of slots that have been transmitted in IWFQ, denoted by q, is no greater than m, i.e., q≤m, due to the work-conserving nature of the server. Thus, the slot with the lowest tag in IWFQ is either m or the slot with the lowest finish tag in B(t).

By Fact 2, it follows that any slot in B(t) has no greater finish tag than the sequence $T_m$, $T_{m+1}$, . . . . Therefore, the largest possible sequence of slots to be served at time t observes the order B(t), m, m+1, . . . , s−1, s, s+1, . . . , k. Hence, the maximum number of slots (after current time t) to be served before s in the IWFQ is |B(t)|+s−m, where |B(t)| is the cardinality of set B(t). Based on Fact 1, it follows that |B(t)|≤B for any time t. Hence, slot s on error-free channel g completes service in IWFQ no later than time $t_{ef}$+B/C as compared to error WFQ by noting that the server rate is C. Therefore, the result follows for slot s. The arbitrary choice of starting time t also implies that the arbitrary choice of slot s; hence, the result holds true for any slot s of flow g, which concludes the proof.

Theorem 1 (delay guarantee). For any packet i on an error-free channel g, its maximum delay $\overline{D}_{g,IWFQ}$ in IWFQ satisfies:

$$\overline{D}_{g,IWFQ} \leq \overline{D}_{g,WFQ} + \overline{d}_g \qquad (8)$$

where $\overline{D}_{g,WFQ}$ is the maximum packet delay of flow g in the error-free WFQ, and $\overline{d}_g$ is given by equation (7).

Proof. For lagging slots, the proof follows from Lemma 2. For a leading slot, by definition, its delay is less than what it would have been under error-free WFQ.

Though the worst-case packet delay of a leading flow does not increase, its packets can be well ahead of their schedule. Thus its new queue delay (the maximum delay for a packet that arrives at an empty queue) has a bounded increase, as shown in Corollary 1.

Theorem 2 (long-term throughput guarantee). For an error-free channel g, let $S_g(0,t)$ denote the aggregate service (in bits) received by channel g in the interval (0,t) in the IWFQ, and $S_g^*(0,t)$ denote the aggregate service (in bits) received by channel g in the interval (0,t) in the error-free WFQ service, then the following inequality holds:

$$S_g(0,t+\overline{d}_g) \geq S_g^*(0,t) \qquad (9)$$

where $\overline{d}_g$ is given by equation (7).

Proof. Let $t_N$ be the finish (real) time of the Nth packet under error-free WFQ and $t'_N$ be the finish time of the same packet under IWFQ. Then, by Lemma 2, $t'_N \leq t_N + \overline{d}_g$. Also, let $S_g^*(0,t) \geq NL_P$, for some integer N. We use the well-known relationship $S_g^*(0,t) \geq NL_P \Leftrightarrow t_N \leq t$. From above, $t'_N - \overline{d}_g \leq t$, which leads to $S_g(0,t+\overline{d}_g) \geq NL_P$. Hence, for any N>0, $$S_g^*(0,t) \geq NL_P \rightarrow S_g(0,t+\overline{d}_g) \geq NL_P.$$

which leads to the inequality (9).

Based on Lemmas 1 and 2, the following result is derived for new queue delay.

Theorem 3 (new queue delay bound). For a flow g on error-free channel, its maximum new queue delay $\overline{D}_{HOL}$ is given by $$\overline{D}_{HOL} = \overline{d}_g + \overline{d}_{WFQ} + \overline{T}_g, \qquad (10)$$

$$\overline{T}_g = \frac{l_g \left(\sum_{j \in F_g} r_j\right)}{Cr_g}, \quad \overline{d}_{WFQ} = \frac{L_P}{C} + \frac{L_P}{C} \frac{\sum_{c \in F} r_c}{r_g}, \qquad (11)$$

where $\overline{d}_g$ is given by (7) and $F_g = F \backslash g$.

Proof. $\overline{d}_{WFQ}$ is the time spent in the head-of-the line (HOL) if the HOL packet contends for service immediately. $\overline{T}_g$ is the maximum amount of time that one has to wait before contending at the HOL due to the fact that flow g might be leading even if the HOL packet arrived at an empty queue. To derive the expression for $\overline{T}_g$, note that flow g can lead by $l_g$ bits or equivalently, $l_g/r_g$ bit rounds. Thus, the number of other flows' bits that can take precedence over a newly arrived packet is $$\frac{l_g}{r_g} \sum_{j \in F_g} r_j.$$

Finally, $\overline{d}_g$ is the wait due to lagging flows.

Theorem 4 (short-term throughput guarantee). Given any time t, for an error-free channel g, assume that the service which flow g receives in error-free WFQ is given by $S^*(t,t_1)$ during time interval $(t,t_1)$ for some $t_1 > t + T_g(t)$. Then the service that flow g receives under IWFQ satisfies $$S(t, t_1) \geq S^*(t + T_g(t), t_1), \qquad (12)$$

$$T_g(t) = \left(\sum_{j \in F_g} b_j(t) + \frac{l_g(t)}{r_g} \sum_{j \in F_g} r_j\right) \frac{1}{C} \qquad (13)$$

where $b_j(t)$ is the number of lagging bits of flow j and $l_g(t)$ is the number of leading bits of flow g at time t.

Proof. At any time t, the amount of time that flow g has to wait to begin service is determined by the number of lagging bits of other flows as well as the amount by which it is leading. The amount of time due to other lagging sources is $\Sigma_{j \in F_g} b_j(t)/C$, from the definition of $b_j(t)$. In addition, flow g has to possibly wait for $l_g(t)/r_g$ bit-by-bit rounds and the maximum amount of time due to this is bounded by $$\frac{l_g(t)}{r_g} \sum_{j \in F_g} r_j / C.$$

Note that the above theorem is trivially valid when all channels are error-free because in that case, $b_j(t) = l_g(t) = 0$. In addition, one cannot give short-term guarantees over intervals smaller than $T_g(t)$.

The dependence on t in the lower bound of the above theorem may be removed as follows:

Corollary 1. Assume that flow g is backlogged during (t, $t_1$) in the error-free WFQ, then the service it receives in the IWFQ satisfies $$S(t,t_1) \geq S^*(t+T_g, t_1) \qquad (14)$$

where $$T_g = \left(\sum_{j \in F_g} b_j + \frac{l_g}{r_g}\sum_{j \in F_g} r_j\right)\frac{1}{C}, \quad \text{if } t_1 - t > T_g.$$

Error-prone Channels

Theorem 5 (delay bound for an error-prone channel). Given any packet of flow e on an error-prone channel, its maximum packet delay $\overline{D}_{IWFQ,e}$, is given by $$\overline{D}_{IWFQ,e} \leq \overline{D}_{WFQ,e} + T_{e,(M+1)} \qquad (15)$$

where $\overline{D}_{WFQ,e}$ is the maximum packet delay of flow e under error-free WFQ, and M is the maximum number of lagging slots of all flows other than flow e, $M = \Sigma_{j \in F_e} b_j / L_P$, and $T_{e,(M+1)}$ is the maximum time it takes for flow e to have its $(M+1)^{th}$ good slot starting from any time t.

Proof. Assume the flow e is lagging. As in Lemma 2, if there are no further errors after time t the delay of a packet of e is increased by the lagging slots of other flows M. However, it is necessary to additionally account for possible errors in the channels of flow e and other lagging flows. Suppose the $(M+1)^{th}$ good state for flow e after time t, occurs at $t+T_{e,(M+1)}$, then we claim that the head-of-the-line packet at time t for flow e would be transmitted no later than $t+T_{e,(M+1)}$. Suppose this were not true, then it would lead to the following conclusion: during all the M+1 good states, one of the other flows had a slot with a lower finish tag. This contradicts the upper bound of M on the number of lagged slots.

Assume a packet arrives when a flow is leading. If the packet finishes when the flow is still leading, then the statement of the theorem is trivially true. If it finishes when the flow is lagging, then there is a time instant before the packet's departure when it is in the queue and the flow starts lagging. Then the above proof holds.

Note that the previous result does not take into account a specific model for channel errors. Any channel error model that deterministically or probabilistically bounds $T_{e,M+1}$, could be easily incorporated into the bound.

Based on the above result on delay bound, the result on throughput follows readily along the lines of Theorem 2.

Theorem 6 (long-term throughput guarantee). For a flow e on an error-prone channel, let $S_e(0,t)$ denote the aggregate service (in bits) received by flow e in the interval (0,t) in the IWFQ, and $S_e^*(0,t)$ denote the aggregate service (in bits) received by channel e in the interval (0,t) in the error-free WFQ service, then the following inequality holds:

$$S_e(0, t+T_{e,M+1}) \geq S_e^*(0,t) \qquad (16)$$

Theorem 7 (short-term throughput guarantee). Given any time t, for a continuously backlogged flow e on an error-prone channel during time interval (t, $t_1$), the aggregate service (in bits) received by flow e in the interval (t, $t_1$) in the IWFQ, denoted by $S_e(t, t_1)$, satisfies:

$$S_e(t, t_1) \geq (N_G - N(t))\frac{r_e}{\sum_{i \in F} r_i}L_P - L_P \qquad (17)$$

$$N(t) = \left(\sum_{i \in F_e} b_i(t) + l_e(t)\frac{\sum_{i \in F_e} r_i}{r_e}\right)/L_P \qquad (18)$$

where $N_G$ is the number of time slots in good state for flow e in (t, $t_1$), $b_i(t)$ is the number of lagging bits of flow i and $l_e(t)$ is the number of leading bits of flow e at time t.

The proof of the above theorem follows along the lines of the proof of Theorem 3.

Modified Embodiment in Wireless Packet Scheduling

The above described embodiment assumes full knowledge of the channel state. However, important constraints should be addressed where such knowledge is lacking, as in typical wireless networks: (a) the channel state is not known in advance and cannot be predicted with complete accuracy, (b) due to error and incorrect channel prediction, transmitted packets may be lost, (c) detection of reception errors is not just a matter of sensing the carrier, since errors at the source do not imply errors at the destination and vice-versa, (d) the base station performs the scheduling, but does not have a full knowledge of which uplink flows have packets to transmit or how many packets a backlogged flow has, and (e) since errors are typically bursty, giving precedence to packets of lagging flows (as IWFQ does) will cause error-prone channels to be polled more often, which increases the scheduling overhead. Due to the channel model of the IFWQ, problems of hidden and exposed stations across multiple shared channel cells are not addressed.

Several of the above constraints either pertain to, or can be effectively addressed at, medium access layer. Hence, one key conclusion for a practical implementation of wireless fair scheduling suited to typical present day wireless networks is that it must be closely coupled with the MAC protocol.

Techniques to Address Typical Wireless Channel Issues

As before in the first embodiment, it is assumed that packets are small and of fixed size; these are very reasonable assumptions for typical wireless networks. Time is slotted, and each data slot accommodates some control information, a data packet and an acknowledgment.

Acknowledgment: Each packet transmission is followed by a short acknowledgment from the destination to the source. Using acknowledgments serves a number of purposes. The most important purpose is to detect loss of packets during transit. As a side-effect, acknowledgements also imply that the base station transmits either the data packet or the ack packet in every transmission—this feature is used to piggyback important control information for future slots on the base station's transmission in the current slot. Acknowledgements have been used in several known medium access protocols for similar purposes.

One-Step Prediction: Since errors are bursty and errors in successive slots are highly correlated, a one-step channel prediction is performed by monitoring the channel condition in the previous slot. Since the base station transmits either a data packet or an ack packet in every slot, each host in the cell monitors the channel during each slot for packets from the base station. If a host can sense activity on the channel but does not receive a good packet from the base station, it detects an error during the current slot. A host predicts that its next slot will be in the same state as the current slot, due to the typically high correlation of channel state across slots. While the one-step prediction does not represent an actual determination of a host's ability to transmit in a subsequent slot, simulation results show that it is very effective for typical wireless channel error models.

One potentially undesirable consequence of the one-step prediction approach is that every host (with a backlogged uplink flow) has to monitor every slot, which can increase its power consumption. This might be alleviated by periodic monitoring of the channel and dynamically estimating the optimal monitoring period in order to alleviate the problem of having the host be in a monitoring mode all the time.

Set of known backlogged flows: Since the base station must schedule packets for both downlink and uplink flows, it needs to know at least which uplink flows are backlogged at any time. In order to allocate slots only to flows which have packets to transmit, the base station keeps a set of "known backlogged flows" and only allocates slots among the flows in this set. The set is updated by the following mechanisms: (a) for downlink flows, the base station has a precise information about the queue lengths, (b) when an uplink flow is allocated a slot, it piggybacks the queue size information on its data packet, (c) when a new uplink flow is created or becomes backlogged, if there is an ongoing backlogged flow from the same mobile host, the information is piggybacked in (b) above, and (d) the base station periodically solicits notifications from new (and newly backlogged) uplink flows by issuing of a control slot.

Wireless Medium Access Protocol

The wireless medium access protocol of the modified preferred embodiment has its origins in DQRUMA. Time is divided into frames, and each frame into slots (the frame size is not fixed, and the number of slots in a frame changes over time). A slot may be either a data slot or a control slot. Each data slot is subdivided into three parts: a control subslot which consists of four mini-slots, a data subslot and an ack subslot. Each control slot is divided into a notification subslot and an advertisement subslot. By means of the scheduling algorithm described below, the base station allocates the slots in a frame among known backlogged flows before the start of the frame. This frames the overview of important MAC issues which need to be addressed in the modified embodiment. For a more detailed general discussion on MAC protocol issues, refer to V. Bharghavan, A. Demers, S. Shenker and L. Zhang, "MACAW: A Medium Access Protocol for Indoor Wireless LANs," *Proc. ACM SIGCOMM '94* and M. J. Karol, Z. Liu and K. Y. Eng, "An Efficient Demand-Assignment Multiple Access Protocol for Wireless Packet (ATM) Networks," *ACM Journal on Wireless Networking*, December 1995, which is incorporated by reference herein.

Identification of New and Backlogged Flows: The base station has a special downlink "broadcast" flow called the control flow, which has a flow id of <0, downlink, 0>. From the scheduling perspective, a control flow is identical to a backlogged data flow of unit weight on an error-free channel. However, when the control flow is allocated a slot, the MAC layer at the base station issues a control slot as opposed to a data slot. The control slot consists of two phases: a notification subslot during which mobile hosts contend in order to notify the base station of new or newly backlogged flows and an advertisement subslot during which the base station broadcasts the newly received notifications as an acknowledgement to the successfully contending mobile hosts.

The notification subslot has a sequence of mini-slots. If a mobile host has a newly backlogged flow but does not have an ongoing backlogged flow on which to piggyback this information, it selects a random mini-slot during which it transmits the notification. During the advertisement subslot, the mobile host knows if its notification was successfully received. This contention mechanism is novel in the way control and data flows are integrated. However, it is simplistic in that contending mobile hosts can only transmit once in a control slot. Using conventional Slotted Aloha to contend in the control slot will improve the probability of successfully sending notifications. Note, that the above contention mechanism impacts the delay and throughput bounds of new flows described with respect to the IFWQ first embodiment; the changes are easy to compute using results from Slotted Aloha.

Data Slot Allocation: Since all flows are either uplink or downlink, in each data slot the base station must transmit either the data packet or the acknowledgement packet. Piggybacked on the packet, the base station provides the ids of the flows which are allocated the next three slots (as a special case, a control slot is identified by setting all the flow ids to <0, downlink, 0>). Since every host in the cell is within range of the base station, a source of an identified flow will be able to hear the packet if its channel is good. In the control phase of the next slot, the source of flow i ($1 \leq i \leq 3$) transmits a channel good flag in mini-slot i if it predicts that the channel will be good (based on one-step prediction). In the fourth mini-slot, the base station identifies the flow which has been chosen for transmission during the current slot, which is the first among the three flows to send the good flag in its mini-slot. If it turns out that all the identified flows are in error, then the base station picks any one downlink flow for transmission.

When an uplink flow transmits a packet, it piggybacks the number of packets in its queue. When this number reaches zero, the base station removes the flow from its set of known backlogged flows.

Wireless Scheduling Protocol

In this section, a wireless packet scheduling (WPS) algorithm is described that emulates the IWFQ first embodiment while meeting practical implementation constraints of the modified embodiment.

Within the constraints identified in the modified embodiment, the following are the key requirements of the wireless packet scheduling algorithm: (a) it should provide fair channel access among flows which are known to be backlogged, (b) it should utilize the location-dependent channel error property in order to locally swap logical slots (preferably within a frame) between flows in order to accommodate short error bursts, (c) across frames, it should provide a system of maintaining credits for lagging flows and debits for leading flows in case swapping within a frame is not possible (as in IWFQ, both credits and debits should be bounded in order to provide separation), (d) since errors are known to be bursty in wireless channels, it should spread the slots allocated to each flow as well as possible within the frame, (e) since errors are bursty, flows which perceive channel error should not be repeatedly polled in subsequent slots (the tagging mechanism in IWFQ will end up doing this since it gives higher precedence to flows that have been lagging the longest), (f) well-behaved flows with error-free channels should be affected as less as possible while still accommodating flows which perceive errors, and (g) the scheduling algorithm should be simple.

The major departure in WPS from IWFQ is a change from the fair queueing to the weighted round robin paradigm. This was motivated by the fact though weighted round robin is much simpler to implement, in our environment, weighted round robin and fair queueing will result in identical error-free service for the following reasons: (a) the base station allocates slots only among known backlogged flows, (b) packets are of fixed size, (c) the base station can only periodically know when an empty flow has been backlogged (for the uplink case); in particular, if a backlogged flow drains its queue during a frame, it drops out of contention for slots until the next new queue phase even if it becomes backlogged subsequently, and (d) when all flows contending for the channel are backlogged, by spreading slot allocation appropriately within each frame, we can exactly replicate the WFQ or $WF^2Q$ service for error-free service.

Thus, WPF modifies the basic weighted round robin scheduling algorithm in order to accommodate location-dependent and bursty wireless channel errors. The following are important features of the WPS algorithm:

Spreading: generates a slot allocation identical to WFQ or $WF^2Q$ when all flows are backlogged.

Swapping within frame: when a flow cannot transmit in its slot because of channel error, it tries to swap its slot with another backlogged flow which has (a) been allocated a slot later in the same frame, and (b) perceives a good channel at the current time; intra-frame swapping is a first level mechanism to accommodate location-dependent errors.

Credit adjustment: when a flow $f_1$ cannot transmit during its slot and cannot swap slots within a frame, but there is at least one backlogged flow $f_2$ that can transmit at the current time ($f_2$ does not have any slots during the remainder of the frame), $f_1$'s credit is incremented and $f_2$'s credit is decremented (both within bounds); the effective weight of each flow at the start of a frame is the aggregate of its default weight and its credit, and the spreading algorithm generates a slot allocation with respect to the effective weights of the flows. Thus, credit adjustment compensates lagging flows at the expense of leading flows in future frames.

One-step prediction: predicts that the channel state for the current time slot will be the same as the monitored channel state during the previous time slot.

Pseudo code shown in FIG. 3 describes the essential parts of the WPS algorithm. In the WPS algorithm, a flow which is unable to transmit in its slot receives credit only if some other flow is able to transmit in its place. When a flow transmits more slots in a frame than it is initially granted, its credit becomes negative. Hence even when there can be no swap within a frame, the system of credit/debit adjustment implicitly preserves the notion of a swapping, just as lag and lead implicitly preserves the notion of swapping in IWFQ. A flow $f_i$ with a negative credit of $c_i$ will not receive any channel capacity for $\lfloor |c_i| \rfloor / r_i$ frames (where the size of a frame is $\Sigma_{i \in B(t)} w_i$ slots, and B(t) is the set of known backlogged flows at the start of the frame, and $w_i$ is the effective weight of flow $f_i$).

The credit adjustment policy above compensates all the credits of a lagging flow in the next frame. For a flow that has accumulated a large number of credits, this could potentially result in the flow capturing the channel for a long time after its channel becomes good (IWFQ also has a similar effect in case a flow has been lagging for a long time). In order to compensate lagging flows over a longer period of time, the number of credits that can be reclaimed in a single frame by any flow could be bounded, thus amortizing the compensation over several frames.

In the average case, WPS closely approximates IWFQ because it tries to achieve separation and compensation by similar instruments (credit/debit similar to lag/lead, and bounds as in IWFQ). However, there is a difference in worst case delay since compensation is achieved by swapping rather than by giving precedence in channel access to longest lagging flows. By swapping, the next attempt of the flow to access the channel is delayed to a later slot, not necessarily the next slot. Thus, swapping loses the precedence history which IWFQ maintains. While this is good for a practical implementation (otherwise the base station will need to poll the most error-prone channel most often), it can starve out a flow under some pathological conditions. Consider an example in which a flow always perceives an error in precisely the exact slots when it is scheduled to transmit, but has some good slots in between when other flows are scheduled to transmit. In IWFQ, the flow will eventually have the minimum service tag and gets highest precedence for transmission in any slot; in WPS, the flow can contend only in designated slots and will be starved. Thus, though the average delay of packets is expected to be very close for both WPS and IWFQ, the worst case delay of WPS is $\infty$.

One important question is the following: when a backlogged flow is unable to transmit because of channel error, and is unable to swap slots within its current frame, how does it choose a flow in a future frame with which it can swap slots? Of course, if slot allocations were generated for several future frames in advance, it would be possible to simply pick the first flow in a future frame that can transmit in the current slot. However, future frames are preferably not allocated in advance. Instead, a weighted round robin ring (with $WF^2Q$ spreading) is generated based on the default weights for all known backlogged flows after each new queue phase. A marker in this ring identifies the last flow that was selected for swapping across frames. When intra-frame swapping fails, the marker is advanced around the ring until a flow is found that can swap with the current slot.

Simulation Results

This section presents simulation results for the WPS algorithm of the modified embodiment. As described above, there are four key components of the algorithm: spreading, swapping, credit adjustment, and prediction. In order to isolate the effect of each of these components, several different algorithms were simulated, with different combinations of the above components.

The following are the algorithms were simulated and are compared in this section:

Blind WWP spreads slots according to $WF^2Q$, but does not attempt to predict the channel state.

WRR modifies Blind WRR by skipping the slot if the channel for the flow is known in (WRR-I) or predicted (in WRR-P) to be in error.

NoSwap combines spreading and credits (but no debits), but does not have any intra-frame swapping. If the channel for the current flow is known (NoSwap-I) or predicted (NoSwap-P) to be in error, it gives a credit to the flow and skips to the next slot.

SwapW combines spreading, swapping and credits (but no debits). If the channel for the current flow is known (SwapW-I) or predicted (SwapW-P) to be in error, it first tries to swap within the frame. Otherwise, it gives a credit to the flow and skips to the next slot.

SwapA combines spreading, swapping, and credit/debit adjustment. SwapA is identical to the WPS algorithm of the modified embodiment described above.

We start by illustrating the key ideas using examples with only two sources. This allows us to demonstrate the effect of the various parameters clearly. Later we consider examples with more sources to illustrate some differences in the performance when there are small number of sources as opposed to a large number of sources.

EXAMPLE 1

We consider an example with two loss-sensitive sources with WFQ weights $r_1=1$, $r_2=1$. For the purposes of simulation, we assume that the channel for Source 2 has no errors and the channel for Source 1 evolves according to a two-state discrete Markov Chain. Let $p_g$ be the probability that the next time slot is good given that the current slot is in error, and $p_e$ be the probability that the next time slot is in error given that the current slot is good.

Then, the steady-state probabilities $P_G$ and $P_E$ of being in the good and bad states, respectively, are given by $$P_G = \frac{p_g}{p_g + p_e}, \quad P_E = \frac{p_e}{p_g + p_e}$$

The arrival processes are assumed to be as follows:

Source 1 is a Markov-modulated Poisson process (MMPP) where the modulated process is a continuous-time Markov chain which is in one of two states ON or OFF. The transition rate from ON to OFF is 9 and OFF to ON is 1. When the Markov chain is in the ON state, arrivals occur according to a Poisson process of rate 2.

Source 2 has constant inter-arrival time of 2.

Note that the channel being Markov is not necessary for the invention to be useful, it is just used for the purposes of simulation. For the two-state Markov chain describing the channel process for Source 1, if we let the bad state be 0 and the good state be 1, it is easy to see that the one-step autocovariance function is $$C(1) \equiv E(X(t)X(t+1)) - E(X(t))E(X(t+1))$$
$$= P_G P_E (1 - (p_g + p_e)).$$

If $p_g+p_e \leq 1$ then $C(1) \geq 0$. Further $C(1)$ is a decreasing function of $p_g+p_e$, and therefore as $p_g+p_e \uparrow 1$, successive time slots become less correlated. Thus, it is a natural to test the prediction algorithm for various values of $p_g+p_e$ with $P_G$ and $P_B$ fixed. We fix the steady-state probability for Channel 1 as $P_G=0.7$. For each packet, we limit the maximum number of retransmissions to 2, i.e., a packet is dropped if it is not successfully transmitted after three attempts. We also limit the number of credits and number of debits to four.

Simulation results are presented in Tables 1–3. The performance of the various scheduling algorithms are compared using the following three performance measures for Source i, i=1, 2:

$\bar{d}_i$: Average delay of successfully transmitted packets $l_i$: Loss Probability, i.e., fraction of packets that are dropped after four transmission attempts $d_i^{max}$: Maximum delay of successfully transmitted packets $\sigma_{d_i}$: The standard deviation of the delay Our main conclusions from the simulation results are:

The scheduling algorithms assuming perfect state information, WRR-I, NoSwap-I, SwapW-I and SwapA-I always perform better than the Blind WRR algorithm. This means that the basic idea of credits significantly improves performance if we have perfect knowledge about the state of each channel. Note that we have assumed that the sources are loss sensitive, and thus our objective is to make the loss probabilities close to zero.

In all the cases where $p_g+p_e \leq 1$, the one-step prediction algorithms WRR-P, NoSwap-P, SwapW-P and SwapA-P perform significantly better than the Blind WRR. Thus, when consecutive time slots are positively correlated, the simple one-step prediction of the invention works remarkably well. In general, prior studies of wireless channel errors have indicates that errors occur in bursts although models for the error can vary. Thus, the invention works very well if the channel errors are indeed bursty.

When $p_g+p_e=1$, prediction of the invention performs poorly. In fact it performs worse than Blind WRR. The fact that $p_g+p_e=1$ implied that the channel states are Bernoulli random variables with the probability of being good chosen as $P_G$. Thus, channel states at successive time slots are uncorrelated and it is not surprising that the one-step prediction performs poorly. However, this is a very unrealistic model of a wireless channel which contradicts all prior claims of bursty channel errors.

NoSwap, SwapW and SwapA perform better than WRR in the following sense: They all reduce the delay for Source 1 significantly while increasing the delay slightly for Source 2. This illustrates the advantage of compensating a source for time slots during which its channel is in error. The difference between the algorithms NoSwap, SwapW and SwapA as compared to WRR is even more dramatic when one does not have perfect knowledge of the channel state.

Swapping will perform better when the channel errors are bursty. The idea is that when a channel is in a sustained bursty state, it is advantageous to let other channels transmit and get compensation later. Thus, the tables show that SwapA is the preferred algorithm especially when the channel state is strongly positively correlated. However, Source 2's delay is slightly higher with swapping as compared to the case when there is no swapping. However this can be adjusted by changing the debit parameter as illustrated in a later example with five sources.

TABLE 1

Example 1. Results for $P_g + P_e = 0.1$

|  | $d_1$ | $l_1$ | $d_1^{max}$ | $\sigma_{d1}$ | $d_2$ | $l_2$ | $d_2^{max}$ | $\sigma_{d2}$ |
|---|---|---|---|---|---|---|---|---|
| Blind WRR | 19.5 | 0.15 | 127 | 19.4 | 0 | 0 | 0 | 0 |
| WRR-I | 43.6 | 0 | 266 | 41.3 | 0 | 0 | 0 | 0 |
| NoSwap-I | 25.3 | 0 | 185 | 26.6 | 1.7 | 0 | 6 | 2.3 |
| SwapW-I | 25.1 | 0 | 185 | 26.5 | 1.7 | 0 | 6 | 2.3 |
| SwapA-I | 21.6 | 0 | 166 | 22.8 | 2.3 | 0 | 10 | 3.4 |
| WRR-P | 54.7 | 0 | 297 | 52.0 | 0 | 0 | 0 | 0 |
| NoSwap-P | 28.2 | 0 | 225 | 29.1 | 1.8 | 0 | 6 | 2.4 |

TABLE 1-continued

Example 1. Results for $P_g + P_e = 0.1$

| | $d_1$ | $l_1$ | $d_1^{max}$ | $\sigma_{d1}$ | $d_2$ | $l_2$ | $d_2^{max}$ | $\sigma_{d2}$ |
|---|---|---|---|---|---|---|---|---|
| SwapW-P | 28.1 | 0 | 225 | 29.1 | 1.8 | 0 | 6 | 2.4 |
| SwapA-P | 24.1 | 0 | 190 | 2.5 | 25.3 | 0 | 10 | 3.5 |

TABLE 2

Example 1. Results for $P_g + P_e = 0.5$

| | $d_1$ | $l_1$ | $d_1^{max}$ | $\sigma_{d1}$ | $d_2$ | $l_2$ | $d_2^{max}$ | $\sigma_{d2}$ |
|---|---|---|---|---|---|---|---|---|
| Blind WRR | 21.3 | 0.058 | 152 | 20.6 | 0 | 0 | 0 | 0 |
| WRR-I | 28.4 | 0 | 176 | 26.3 | 0 | 0 | 0 | 0 |
| NoSwap-I | 11.4 | 0 | 92 | 10.7 | 1.0 | 0 | 6 | 1.5 |
| SwapW-I | 11.2 | 0 | 92 | 10.6 | 1.0 | 0 | 6 | 1.6 |
| SwapA-I | 11.0 | 0 | 92 | 10.2 | 1.1 | 0 | 10 | 1.8 |
| WRR-P | 115.5 | 0.003 | 369 | 79.4 | 0 | 0 | 0 | 0 |
| NoSwap-P | 18.1 | 0.003 | 138 | 16.8 | 1.5 | 0 | 6 | 1.9 |
| SwapW-P | 17.7 | 0.003 | 136 | 16.5 | 1.6 | 0 | 6 | 1.9 |
| SwapA-P | 16.8 | 0.003 | 123 | 15.3 | 1.8 | 0 | 10 | 2.4 |

TABLE 3

Example 1. Results for $P_g + P_e = 1.0$

| | $d_1$ | $l_1$ | $d_1^{max}$ | $\sigma_{d1}$ | $d_2$ | $l_2$ | $d_2^{max}$ | $\sigma_{d2}$ |
|---|---|---|---|---|---|---|---|---|
| Blind WRR | 24.3 | 0.029 | 158 | 22.6 | 0 | 0 | 0 | 0 |
| WRR-I | 28.8 | 0 | 170 | 26.5 | 0 | 0 | 0 | 0 |
| NoSwap-I | 10.2 | 0 | 91 | 9.3 | 0.63 | 0 | 6 | 1.0 |
| SwapW-I | 9.9 | 0 | 91 | 9.1 | 0.65 | 0 | 6 | 1.0 |
| SwapA-I | 9.9 | 0 | 91 | 9.1 | 0.65 | 0 | 6 | 1.0 |
| WRR-P | 6301.5 | 0.029 | 11930 | 3430 | 0 | 0 | 0 | 0 |
| NoSwap-P | 26.8 | 0.028 | 179 | 22.6 | 1.7 | 0 | 6 | 1.6 |
| SwapW-P | 26.4 | 0.027 | 182 | 22.5 | 1.7 | 0 | 6 | 1.6 |
| SwapA-P | 26.4 | 0.027 | 182 | 22.5 | 1.7 | 0 | 8 | 1.6 |

EXAMPLE 2

We consider an example with the same parameters as in Example 1, except that instead of setting an upper limit on the number of retransmission attempts per packet, we set an upper limit on the maximum delay of a packet to be 100. If a packet is in the system for more than 100 time slots, then it is dropped; this could possibly happen even before it reaches the head-of-the-queue. Thus, we now assume that the sources are also delay-sensitive. We let $p_g+p_e=0.1$ and the results are shown in Table 4. From the results, it should be clear that this example complements Example 1 by leading to the same conclusions regarding the relative performances of the various algorithms when the sources are both delay and loss sensitive.

TABLE 4

Results from Example 2

| | $d_1$ | $l_1$ | $d_1^{max}$ | $\sigma_{d1}$ | $d_2$ | $l_2$ | $d_2^{max}$ | $\sigma_{d2}$ |
|---|---|---|---|---|---|---|---|---|
| Blind WRR | 32.4 | 0.025 | 100 | 26.9 | 0 | 0 | 0 | 0 |
| WRR-I | 32.4 | 0.025 | 100 | 26.9 | 0 | 0 | 0 | 0 |
| NoSwap-I | 23.2 | 0.007 | 100 | 22.6 | 1.6 | 0 | 6 | 2.3 |
| SwapW-I | 23.1 | 0.007 | 100 | 22.6 | 1.7 | 0 | 6 | 2.3 |
| SwapA-I | 20.7 | 0.003 | 100 | 20.8 | 2.3 | 0 | 10 | 3.4 |
| WRR-P | 34.9 | 0.035 | 100 | 27.7 | 0 | 0 | 0 | 0 |
| NoSwap-P | 25.3 | 0.009 | 100 | 23.7 | 1.8 | 0 | 6 | 2.3 |
| SwapW-P | 25.2 | 0.009 | 100 | 23.6 | 1.8 | 0 | 6 | 2.4 |
| SwapA-P | 22.5 | 0.006 | 100 | 21.9 | 2.5 | 0 | 10 | 3.5 |

EXAMPLE 3

We consider a three-source example with the channel and source parameters as in Table 5. Source 1's arrivals occur according to a MMPP process with the modulating Markov chain as in Example 1, Source 2's arrivals are Poisson and Source 3's arrivals have a constant inter-arrival time. The arrival rate for Source i is denoted by $\lambda_i$. The maximum number of credits, debits and retransmissions are chosen as in Example 1.

The delay and loss performance of Blind WRR, WRR-P and SwapA-P are shown in Table 6. Again this example illustrates that SwapA-P trades off the performance of a severely errored channel (in this case Channel 1) against the less error-prone channels in a better fashion than WRR-P. For instance compare to WRR-P, $d_1$ is decreased by 26% while the delay for $d_2$ increase 6% and the $d_3$ increases by 15%. The increases in the delays of Sources 2 and 3 can be further controlled by suitable choice of upper limits on credits and debits as will be shown in a later example. The main conclusion from the examples so far is that SwapA-P allows greater flexibility in hiding errors from a source. However, when the number of sources is larger, the differences between WRR and SwapA depend on how heavily loaded the system is as shown in the following examples:

TABLE 5

Example 3. Source and Channel Parameters

| Source | $\lambda_i$ | $P_g$ | $P_e$ |
|---|---|---|---|
| 1 | 0.2 | 0.07 | 0.03 |
| 2 | 0.25 | 0.095 | 0.005 |
| 3 | 0.25 | 0.09 | 0.01 |

TABLE 6

Example 3. Average Delay and Loss Performance

| | $d_1$ | $l_1$ | $d_2$ | $l_2$ | $d_3$ | $l_3$ |
|---|---|---|---|---|---|---|
| Blind WRR | 41.6 | 0.134 | 1.1 | 0.021 | 10.9 | 0.038 |
| WRR-P | 59.2 | 0 | 1.7 | 0 | 8.0 | 0 |
| SwapA-P | 44.0 | 0 | 1.8 | 0 | 9.2 | 0 |

EXAMPLE 4

We consider an example with five sources. The channels for all five sources are assumed to evolve according to independent discrete-time two-state Markov chains. Sources 2 and 4 are assumed to generate arrivals according to independent Poisson processes, and Sources 1, 3 and 5 are MMPP sources with the underlying Markov chain having the same parameters as that of the MMPP source in Example 1. The arrival rate of source i is denoted by $\lambda_i$ and the parameters of the sources and channels are given in Table 7. The WFQ weights, $r_i$, r=1, 2, 3, 4, 5, are all assumed to be 1, the maximum number of retransmissions for Sources 1, 2, 3 and 5 is set to 2, and is set equal to zero for Source 4. Note that the arrival rates for Sources 2 and 4 are so high that their delays would be unbounded. In other words, Sources 2 and 4 have packets to send almost all the time, and the only measure of performance that is relevant to these sources is the throughput, or equivalently, packet loss probability. The maximum number of debits and credits for all sources is set equal to 4. The performance results are presented in Table 8. Only average delay and loss probability are presented in the table. The main conclusion from Table 8 is that SwapW-P is clearly superior to the other algorithms that use one-step prediction. Both Examples 1 and 4 show that there is not a significant advantage to swapping slots within a frame, but swapping slots across multiple frames, and using credits and debits is clearly superior to WRR.

TABLE 7

Example 4. Source and Channel Parameters

| Source | $\lambda_i$ | $P_g$ | $P_e$ |
|---|---|---|---|
| 1 | 0.08 | 0.09 | 0.01 |
| 2 | 8.0 | 0.095 | 0.005 |
| 3 | 0.08 | 0.08 | 0.02 |
| 4 | 8.0 | 0.07 | 0.03 |
| 5 | 0.08 | 0.035 | 0.015 |

TABLE 8

Example 4. Delay and Loss Performance

| | $d_1$ | $l_1$ | $l_2$ | $d_3$ | $l_3$ | $l_4$ | $d_5$ | $l_5$ |
|---|---|---|---|---|---|---|---|---|
| Blind WRR | 40.4 | 0.025 | 0.011 | 75.4 | 0.057 | 0.43 | 253.6 | 0.12 |
| WRR-I | 14.5 | 0 | 0 | 26.0 | 0 | 0 | 85.4 | 0 |
| NoSwap-I | 14.8 | 0 | 0 | 19.6 | 0 | 0 | 64.1 | 0 |
| SwapW-I | 14.7 | 0 | 0 | 19.4 | 0 | 0 | 64.6 | 0 |
| SwapA-I | 14.4 | 0 | 0 | 17.4 | 0 | 0 | 46.0 | 0 |
| WRR-P | 15.8 | 0 | 0 | 29.6 | 0.0 | 0.03 | 96.5 | 0 |
| NoSwap-P | 15.8 | 0 | 0 | 22.0 | 0 | 0.04 | 73.3 | 0 |
| SwapW-P | 15.7 | 0 | 0 | 21.8 | 0 | 0.03 | 73.7 | 0 |
| SwapA-P | 15.6 | 0 | 0 | 19.9 | 0 | 0.03 | 52.5 | 0 |

EXAMPLE 5

We now present a situation where WRR-P performs as well as SwapA-P. Consider the same parameters as in Example 4, except that the arrival rates for Sources 2 and 4 are now assumed to be equal to 0.07. This system is stable since $$\sum_{i=1}^{5} \lambda_i / P_{G_i} < 1, \quad \text{and} \quad \lambda_i < P_{G_i}, \forall i.$$

Average delay and loss probabilities are shown in Table 9. The performance of WRR-P and SwapA-P are virtually identical. The reasons for this are two-fold:
  Since the number of sources is 5, the frame size for WRR is 5 and thus the chance of the same channel being in error in multiple frames is small. Thus, credits are not accumulated very often in SwapA-P.
  WRR-P naturally allocates "credits" because of the stability of the system. In other words, if a source is skipped over during a frame due to error in its channel, it will automatically be compensated later because other sources will eventually "run out" of packets due to the system stability condition.

However, as the following example shows, it would be erroneous to conclude from the previous example that WRR and SwapA are virtually identical when the number of sources is large and the stability condition is satisfied.

TABLE 9

Example 5. Delay and Loss Performance

| | $d_1$ | $l_1$ | $d_2$ | $l_2$ | $d_3$ | $l_3$ | $d_4$ | $l_4$ | $d_5$ | $l_5$ |
|---|---|---|---|---|---|---|---|---|---|---|
| WRR-P | 4.1 | 0 | 1.3 | 0 | 7.3 | 0 | 6.7 | 0.03 | 19.7 | 0 |
| SwapA-P | 4.5 | 0 | 1.5 | 0 | 7.3 | 0 | 6.0 | 0.03 | 19.1 | 0 |

EXAMPLE 6

Consider a five source example with the channel and source parameters given in Table 10. Note that Sources 1 through 4 are identical and Source 5's channel has a higher steady-state error probability than the rest. We limit the maximum delay to 200, and the number of credits and debits to four each. The average delay and loss probabilities for Source 1 (recall that Sources 1 through 4 are identical) and Source 5 are shown in Table 11 as a function of the maximum number of debits D for Sources 1–4, and the maximum number of credits C for Source 5. SwapA-P performs much better than WRR-P in the sense that Source 5's performance can be traded off more effectively against the performance of the other sources. Further, it allows one to control this trade-off by using upper bounds on credits and debits. For example, Sources 1–4 could be low priority video sources which are loss tolerant. Thus, Source 5's quality has been dramatically improved by SwapA-P without significantly degrading the performance of Sources 1 through 4 as compared with WRR-P. The reason for this is as follows:
  Under WRR-P, even though the system is stable, it takes a long time for Source 5 to be compensated for errors in its channel since the other sources load the system rather heavily.
  In contrast, SwapA-P "hides" short error bursts from Source 5 by providing compensation over shorter time scales by using credits. It further avoids penalizing the less error-prone sources (Sources 1 through 4) by upper bounding the number of credits and debits.

TABLE 10

Example 6. Source and Channel Parameters

| Source(s) | $\lambda_i$ | $P_g$ | $P_e$ |
|---|---|---|---|
| 1–4 | 0.095 | 0.005 | 0.19 |
| 5 | 0.07 | 0.03 | 0.1 |

TABLE 11

Example 6. Delay and Loss Performance

| | D | C | $d_1$ | $l_1$ | $\sigma_{d1}$ | $d_5$ | $l_5$ | $\sigma_{d5}$ |
|---|---|---|---|---|---|---|---|---|
| WRR-p | — | — | 167.5 | 0.30 | 28.9 | 155.1 | 0.23 | 58.1 |
| SwapA-P | 4 | 4 | 171.8 | 0.36 | 29.0 | 94.7 | 0.04 | 58.1 |
| SwapA-P | 2 | 4 | 171.8 | 0.36 | 28.9 | 100.4 | 0.05 | 58.7 |
| SwapA-P | 0 | 4 | 170.6 | 0.34 | 30.0 | 136.6 | 0.13 | 51.1 |
| SwapA-P | 0 | 1 | 169.5 | 0.31 | 31.2 | 145.3 | 0.17 | 47.7 |

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A base and host wireless shared channel network packet communication method for scheduling communications for one or more base communication channels comprising the steps of:

monitoring, by a plurality of hosts, to analyze a channel error state for a base communication channel;

for the base communication channel analyzed in said step of monitoring, implementing a scheduling algorithm for said plurality of hosts;

communicating information according to a schedule determined by the scheduling algorithm;

repeating said monitoring step;

repeating said implementing step and compensating in the scheduling algorithm for the base communication channel analyzed in said step of monitoring for hosts previously determined by said monitoring step to have an error presence state.

2. The method according to claim 1, wherein each of said plurality of hosts indicates an error presence statement to the base by a NAK and an error free state by an ACK after each slot is received.

3. The method according to claim 2, wherein the base maintains a set of known backlogged flows among hosts and said scheduling algorithm schedules said set of known backlogged flows.

4. The method according to claim 3, wherein the base obtains uplink backlogged queue information from queue length information piggybacked onto data transmissions from hosts.

5. The method according to claim 4, wherein the base station allots slots only to hosts having queue length information indicated possession of packets to transmit.

6. A base and host wireless shared channel network packet communication method comprising the steps of:

monitoring, by a plurality of hosts, to analyze a channel error state for a base communication channel;

implementing a scheduling algorithm for said plurality of hosts;

communicating information according to a schedule determined by the scheduling algorithm;

repeating said monitoring step;

repeating said implementing step and compensating for hosts previously determined by said monitoring step to have an error presence state;

wherein said compensating comprises a swap of slots between a flow having an error presence state for its assigned slot and another flow scheduled for a later slot if a swap of slots is possible.

7. The method according to claim 6, wherein a swap of slots is possible when another flow assigns an error free state, possesses a packet and possesses a later slot.

8. The method according to claim 7, wherein said swap of slots is between flows assigned within a single frame.

9. The method according to claim 8, wherein flows are normally assigned to spread slots in a frame.

10. The method according to claim 8, further comprising a step of assigning values to leading and lagging flows when a swap of slots within a frame fails to compensate for a host previously determined to have an error state or a swap of slots is not possible.

11. The method according to claim 10, wherein leading flows are prevented from transmitting for a number of frames determined by their assigned value and weight if a lagging flow exists and is capable of transmitting in said number of frames.

12. The method according to claim 11, wherein lagging flows compensate for their associated value in a single frame.

13. The method according to claim 12, wherein values assigned to lagging flows are limited to a predetermined maximum.

14. The method according to claim 11, wherein lagging flows compensate for their associated value over a plurality of frames.

15. A base and host wireless shared channel network packet communication method comprising the steps of:

monitoring, by a plurality of hosts, to analyze a channel error state for a base communication channel;

implementing a scheduling algorithm for said plurality of hosts;

communicating information according to a schedule determined by the scheduling algorithm;

repeating said monitoring step;

repeating said implementing step and compensating for hosts previously determined by said monitoring step to have an error presence state;

wherein said step of monitoring conducted by each of said plurality of hosts comprises:

monitoring each base station transmission slot;

predicting an error presence state for a next slot if a current slot contains activity but no good packet; else predicting an error free state for said next slot.

16. A base and host wireless shared channel network packet communication method comprising the steps of:

monitoring, by a plurality of hosts, to analyze a channel error state for a base communication channel;

implementing a scheduling algorithm for the base communication channel analyzed in said step of monitoring for said plurality of hosts;

communicating information according to a schedule determined by the scheduling algorithm;

repeating said monitoring step;

repeating said implementing step and compensating in the scheduling algorithm for the base communication channel analyzed in said step of monitoring for hosts previously determined by said monitoring step to have an error presence state;

wherein the base and hosts communicate via a protocol having data slots and control slots.

17. The method according to claim 16, wherein each data slot comprises a control subslot having four minislots, a data subslot and an ACK/NAK subslot.

18. A base and host wireless shared channel network packet communication method comprising the steps of:

separating communication flows into leading and lagging flows, wherein leading flows are flows associated with a host having a queue length less than a queue length of its error free service at a predetermined time and lagging flows are flows associated with a host having a queue length greater than a queue length of its error free service at said predetermined time instant;

reducing the lag of lagging flows in a time after said predetermined time by allocating access to said lagging flows from said leading flows.

19. The method according to claim 18, wherein hosts maintain separate packet and slot queues, priority tags are maintained in said slot queues, and said packet queues discard packets once a predetermined packet backlog is reached to reduce a lag of a lagging flow, while the slot having the highest priority tag is maintained.

* * * * *

UNITED STATES PATENT AND TRADEMARK OFFICE
CERTIFICATE OF CORRECTION

PATENT NO. : 6,728,257 B1
DATED : April 27, 2004
INVENTOR(S) : Bharghavan et al.

It is certified that error appears in the above-identified patent and that said Letters Patent is hereby corrected as shown below:

Title page,
Item [56], References Cited, OTHER PUBLICATIONS, "A. Parekh" reference, delete "LID" and insert -- LIDS -- therefor.

Column 4,
Line 45, please delete "f," and insert -- $f_1$ -- therefor.

Column 5,
Line 67, please delete "$1_i$," and insert -- $l_i$ -- therefor.

Column 7,
Line 6, paragraph is a continuation of the one that starts "4. Readjusting…" and should be indented the same.
Lines 37 and 39, please delete "$d_{WFQ}{}^{max}$" and insert -- $d_{WFQ}^{max}$ -- therefor.
Line 39, please delete "$d_{IWFQ}{}^{max}$" and insert -- $d_{IWFQ}^{max}$ -- therefor.
Line 39, please avoid the line break in the term "B/C".

Column 8,
Line 61, remove hanging indent starting with "its".

Column 18,
Line 60, in heading of last column, please delete "$\sigma_{d2}$" and insert -- $\sigma_{d_2}$ -- therefor.

Column 19,
Lines 5, 14, 29 and 60, in heading of last column, please delete "$\sigma_{d2}$" and insert -- $\sigma_{d_2}$ -- therefor.

Column 20,
Line 5, in heading of last column, please delete "$\sigma_{d2}$" and insert -- $\sigma_{d_2}$ -- therefor.

Column 22,
Line 50, in heading of last column, please delete "$P_g$" and insert -- $p_g$ -- therefor.
Line 50, in heading of last column, please delete "$P_e$" and insert -- $p_e$ -- therefor.
Line 59, in heading of last column, please delete "$\sigma_{d1}$" and insert -- $\sigma_{d_1}$ -- therefor.

UNITED STATES PATENT AND TRADEMARK OFFICE
CERTIFICATE OF CORRECTION

PATENT NO. : 6,728,257 B1
DATED : April 27, 2004
INVENTOR(S) : Bharghavan et al.

It is certified that error appears in the above-identified patent and that said Letters Patent is hereby corrected as shown below:

Column 22 (cont'd),
Line 59, in heading of last column, please delete "$\sigma_{d5}$" and insert -- $\sigma_{d_5}$ -- therefor.

Signed and Sealed this

Thirtieth Day of August, 2005

JON W. DUDAS
*Director of the United States Patent and Trademark Office*